Patented Apr. 29, 1952

2,594,538

UNITED STATES PATENT OFFICE 2,594,538

METHOD OF MAKING CONFECTIONERY PRODUCTS

Jorgen Brabaek, Copenhagen, Denmark, assignor to Aktieselskabet "Volund," Copenhagen, Denmark, a Danish company No Drawing. Application February 4, 1950, Serial No. 142,523. In Denmark July 19, 1943

7 Claims. (Cl. 99—134)

1

This invention pertains to the production of confectionery products and is more particularly concerned with the preparation of a caramelized product.

In the production of candies, caramels, fillers and the like in the confectionery industry, one of the essential operations heretofore carried out has been a boiling step in which the sugar-containing raw materials are concentrated or melted in order to obtain masses having a high sugar content and which, after cooling, assume a solid or pasty form.

In the production of confections employing these boiling operations or similar methods, the possibilities of adding desired quantities of aromatics, e. g., for flavoring or coloring, vitamins, and the like, to the products, have been greatly limited. Such substances could not advantageously be added to the raw materials because the subsequent lengthy boiling or drastic melting steps woul remove volatile substances and otherwise deleteriously affect the added materials. Similarly, vitamins and other like heat-susceptible materials originally present in the raw materials were generally lost to a large extent. It has therefore been necessary as far as possible to add such supplementary materials at a later stage in the process or to put them inside the finished goods in the form of fillers.

Accordingly, the methods heretofore used have involved a number of disadvantages, e. g., it has either been impossible to retain the full natural taste or the physiologically-active components of the original materials, or special treatment at additional cost has been necessary to incorporate the desired components in the final product.

It is the object of the invention to provide an improved process for making confectionery products which avoids the above-mentioned disadvantages.

It is a further object of the invention to provide a process for making confectionery products wherein there are obtained desirable caramelized products containing the aromatics, vitamins and the like present in the raw material.

It is still a further object of the invention to provide an improved process of the character indicated wherein flavoring materials, vitamins and the like may be incorporated with the raw materials before treatment without danger of subsequent deterioration.

According to the invention, candles, caramels, fillers for candies, confections and the like are prepared from raw materials such as sugar-containing natural products, e. g. fruits and milk, or from preparations derived from natural products, such as malt extract, whey, sugar beet juice, and the like, by subjecting relatively thin layers of the materials to mild dehydration and heating.

2

In accordance with my process, the sugar content of the hydrous raw materials is caramelized, i. e., melted, to the degree desired, but the mass is transformed into pasty or solid form so quickly and at so low a temperature that the aromatics, vitamins and other delicate and heat-susceptible ingredients of the raw materials are not lost or injured. The thus-concentrated product may be made available in lozenge form or as a filler for candies or confections.

My process entails the further advantage that the perfect concentration of the raw materials obtainable thereby will, as a rule, cause the sugar content of the materials to be sufficient and the addition of further quantities of sugar will usually be unnecessary.

In the case of raw materials having a high water content it is preferable to subject the materials to a pre-concentration prior to the final concentration step, e. g. by evaporation under vacuum at relatively low temperature.

By reason of the mild conditions of concentration which feature my process, vitamins naturally occurring in the materials treated are not injured and a subsequent vitaminization of the final product is not required. If the raw materials do not contain the quantities of vitamins, aromatics, and the like required in the final product, the necessary quantities may be readily supplied by adding to the hydrous raw materials substances containing vitamins, such as carrots, lemon or hop pulp or juice, or suitable coloring and flavoring materials.

According to my process, the sugar component of the raw material mixture may be caramelized without the disadvantageous side reactions encountered in process heretofore employed. In one form of the invention an inversion of the invertible carbohydrates present in the raw materials is effected by suitable adjustment of the proportions between the carbohydrates and the organic acids contained in or added to the raw materials. An adjustment is made in the proportion between acid and invertible carbohydrates in the raw materials used by a suitable modification, determined empirically, of the quantities of the carbohydrates in proportion to the quantities of organic acids in the raw materials, large quantities of acid being added, e. g. five to twenty times the stoichiometric quantities used in ordinary inversion processes, so that the inversion may take place in the course of the rapid concentration process. Owing to the fact that during the process of treatment considerable quantities of acid will be neutralized, sufficiently large quantities of acid must be added that the acid concentration will materially exceed the acid concentration used in an ordinary inversion of starch in an autoclave or in the inversion of cane sugar by boiling. It must be borne in mind that, whereas in these customary processes the treatment usually extends over a period of one to two hours, and 0.05% hydrochloric acid is, for example used, the inversion in the present process generally takes place in the course of a few seconds or in any case within a few minutes at most, depending upon the length of the treatment chamber. It has been found desirable to employ a somewhat higher temperature in the treating chamber than is used in prior boiling processes, the temperature being about the same as that used in autoclaves.

It is possible to use in my process five to twenty times the stoichiometric quantity of acid used in known processes of inversion. The product will suffer no harm and the excess acid may, if necessary, be subsequently neutralized as by the addition of a neutralizing agent, e. g. sodium carbonate. The inversion effects the transformation of the multi-valent sugar substances into mono and divalent substances, whereby the product becomes more easily digestible and will have a finer, sweeter taste and a better caramel consistency.

In carrying out the invention, the mixture of materials to be treated, e. g., a mixture of a sugar or an edible material convertible to sugar by inversion, and an organic acid or a material containing an organic acid, are subjected to the action of rapidly-moving air while exposed in a thin layer on a heated surface. For best results, the layer of material should have a thickness of 0.05 to 0.5 mm., preferably about 0.3 mm. The supporting surface upon which the material is carried may be a revolving drum or an endless belt. The apparatus disclosed in my copending application, Serial No. 700,364, filed October 1, 1946, now abandoned, is illustrative of suitable apparatus for carrying out my process. The supporting surface is heated to a temperature of 80 to 160° C., preferably 120° C. A rotating drum may be heated internally for example by steam under pressure. In practice the carrying surface is moved at 40 to 100 feet per minute, preferably 60 to 80 feet per minute, and the drying air (a non-saturated air at room temperature, i. e., 20 to 25° C.) is passed over the surface of the material with a velocity of 50 to 100 feet per second, preferably 75 to 80 feet per second. The material is subjected to the action of the air current for about 5 to 15 seconds, preferably about 10 seconds, and is then cooled by any convenient means.

The materials treated in accordance with the invention are those commonly used in the preparation of confectionery products, such as candies, fillers, and the like. The sugar may be in the form of sucrose, glucose or the like, or may be supplied as a material convertible to mono and divalent sugars, by inversion, e. g., milk or whey. The inversion agent may be an edible organic acid such as citric acid, malic acid or the like, or may be an enzyme-containing material such as malt. The organic acid is advantageously added in its naturally-occurring form, e. g., as orange juice, apple pulp and the like. If desired, additional vitamins, flavoring materials, e. g., vanilla, coloring agents, e. g., one of the U. S. certified colors, and the like may be added to the hydrous mixture. If the mixture is very fluid it is advantageously pre-concentrated, e. g., by evaporation under vacuum until an easily-spreadably consistency is obtained.

The following specific examples are further illustrative of the invention without being intended as limitations thereon:

Example 1

A mixture of 20 parts by weight of sugar, 15 parts by weight of glucose and 6 parts by weight of fresh lemon juice is prepared at room temperature and is immediately poured out in a thin layer of about 0.3 mm. thickness on a drum heated to a temperature of about 120° C. The surface of the drum is moved with a velocity of about 60 feet per minute. The surface of the thin layer or film is subjected to the drying influence of an un-saturated air current at room temperature, i. e., about 20° C. and moving horizontally over the layer at a velocity of 60 to 65 feet per second under a vacuum of 25–40 mm. of water. After about 10 seconds of exposure the superfluous water content has been removed and the sugar content is partially caramelized, i. e., a distinct caramel taste is obtained. The material is then scraped off the drum and has a paste-like consistency. By subsequent cooling to normal temperature the mass becomes stiff. This product contains most of the vitamins in an undeteriorated state and can be preserved in this state without any use of preserving means.

Example 2

20 parts by weight of sugar are mixed with 60 parts by weight of apple-pulp and the mixture is poured out in a thin layer of 0.5 mm. thickness on the surface of a rotating drum, which is heated to about 120° C. by steam at a pressure of about two atmospheres. The drum is rotated at the rate of 65 to 100 feet per minute, preferably about 80 feet per minute, and a current of air at room temperature is passed parallel to the surface of the layer with a velocity of about 80 feet per second. After about eight seconds, the mass is scraped off the drum in a paste-like state which by subsequent cooling to normal temperature becomes a jelly. This product contains most of the vitamins present in the raw materials and can be kept in this state for years without needing any preserving means.

Example 3

80 parts by volume of whey from the usual manufacture of cheese are mixed with 20 parts by volume of the juice of fresh oranges. At room temperature the mixture, in the course of one hour, is poured out on the surface of a drum heated to 140–150° C., the drum having a surface of 33 square feet and being moved at a velocity of five revolutions per minute. This gives a layer which is 0.1 to 0.12 mm. thick. During the movement of the drum an air current at room temperature is countercurrently passed over the surface of the layer at a velocity of about 80 feet per second. After a lapse of about 10 seconds, the superfluous water content has been removed and some of the sugar content is caramelized so that the material scraped off has a pasty consistency. The material is placed in a mold and after cooling therein it stiffens and acquires the same consistency as a "Hopjes" ready for eating.

Example 4

80 parts by volume of whey are mixed with 25 parts by volume of malt salt. The mixture is then subjected to desiccation and caramelization under the same conditions as those described in Example 3. The product is similar in consistency to that obtained in the previous example, and when cooled in a mold it stiffens and acquires the consistency of a "Hopjes."

Example 5

80 parts by volume of whey from the manufacture of cheese are mixed with 20 parts by volume of fresh lemon juice and the mixture is heated at a temperature of 45° C. under a vacuum of about 9000 mm. of water until it has acquired a readily-spreadable consistency. To the mixture is then incorporated, with thorough mixing, a few drops of vanilla, a vitamin fortification compound and a U. S. certified yellow color. The partly-dehydrated mixture is then subjected to desiccation on the surface of a heated drum under the same conditions as those used in preparing the product of Example 3. A vitamin-rich caramelized confectionery is obtained.

It will be apparent that various changes may be made without departing from the scope of the invention, and it is intended, therefore, that all matter contained in the foregoing description shall be interpreted as illustrative and not in a limiting sense.

This application is a continuation-in-part of my copending application, Serial No. 700,363, filed October 1, 1946, now abandoned.

What I claim and desire to secure by Letters Patent is:

1. The method of making a caramelized confectionery product from fruit pulp, fruit juice, and the like, which comprises forming a preconcentrated solution of the material, adding flavoring materials, vitamins and coloring agents, and thereafter passing the resulting mixture in a thin layer on a supporting surface through a heating zone, heating the inner side of said layer to a temperature of 80° to 160° C. for a short period of time sufficient to caramelize the mixture, and simultaneously passing non-preheated air adjacent the outer surface of said layer.

2. The method of making a caramelized confectionery product from fruit pulp, fruit juice, and the like, which comprises forming a preconcentrated solution of the material, adding flavoring materials, vitamins and coloring agents, and thereafter passing the resulting mixture in a thin layer on a supporting surface of a thickness of about 0.05 mm. to 0.5 mm. through a heating zone, heating the inner side of said layer to a temperature of 80° to 160° C. for a short period of time sufficient to caramelize the mixture, and simultaneously passing non-preheated air adjacent the outer surface of said layer.

3. The method of making a caramelized confectionery product from fruit pulp, fruit juice, and the like, which comprises forming a preconcentrated solution of the material, adding flavoring materials, vitamins and coloring agents, and thereafter passing the resulting mixture in a thin layer on a supporting surface of a thickness of about 0.05 mm. to 0.5 mm. through a heating zone, heating the inner side of said layer to a temperature of 80° to 160° C., for five to fifteen seconds whereby to caramelize the mixture, and simultaneously passing non-preheated air adjacent the outer surface of said layer.

4. The method of making caramelized confectionery products from fruit pulp, fruit juice, and like hydrous materials which comprises forming a concentrated solution of the material, adding to the concentrated solution five to twenty times the stoichiometric quantity of organic acid required for inversion of the invertible components of the solution, forming a thin layer of said material on a supporting surface and heating the inner side of said layer at a temperature of 80° to 160° C. for a short period of time sufficient to caramelize the material and invert the invertible components into mono and divalent sugars while simultaneously passing non-preheated air adjacent the outer surface of said layer and thereafter adding to the material an alkaline agent to neutralize the acidic components thereof.

5. The method of making caramelized confectionery products from fruit pulp, fruit juice, and like hydrous materials which comprises forming a concentrated solution of the material, adding to the concentrated solution five to twenty times the stoichiometric quantity of organic acid required for inversion of the invertible components of the solution, forming a thin layer of material on a supporting surface of a thickness of about 0.05 mm. to 0.5 mm., and heating the inner side of said layer at a temperature of 80° to 160° C. for a short period of time sufficient to caramelize the material and invert the invertible components into mono and divalent sugars while simultaneously passing non-preheated air adjacent the outer surface of said layer and thereafter adding to the material an alkaline agent to neutralize the acidic components thereof.

6. The method of making caramelized confectionery products from fruit pulp, fruit juice, and like hydrous materials which comprises forming a concentrated solution of the material, adding to the concentrated solution five to twenty times the stoichiometric quantity of organic acid required for inversion of the invertible components of the solution, forming a thin layer of said material on a supporting surface of a thickness of about 0.05 mm. to 0.5 mm., and heating the inner side of said layer at a temperature of 80° to 160° C. for five to fifteen seconds whereby to caramelize the material and invert the invertible components into mono and divalent sugars while simultaneously passing non-preheated air adjacent the outer surface of said layer, and thereafter adding to the material an alkaline agent to neutralize the acidic components thereof.

7. A method of making a caramelized confectionery product which comprises forming a hydrous mixture of fruit pulp containing substances convertible by inversion to mono and divalent sugars, and a material adapted to effect inversion of said first named substance, the amount of said inverting material being five to twenty times the stoichiometric quantity required for inversion, and subjecting said mixture to rapid heating, whereby to effect inversion and to caramelize the sugar content thereof without deleteriously affecting the other constituents of said mixture, said heating being effected by forming on a supporting surface a thin layer of a thickness of about 0.05 mm. to 0.5 mm. of the hydrous mixture, and heating the inner side of said layer at a temperature of 80° to 160° C., while simultaneously passing non-preheated air adjacent the outer surface of said layer.

JORGEN BRABAEK.

REFERENCES CITED

The following references are of record in the file of this patent:

UNITED STATES PATENTS

| Number | Name | Date |
|---|---|---|
| 452,793 | Kavanaugh | May 26, 1891 |
| 739,229 | Shaw | Sept. 15, 1903 |
| 1,781,636 | Gheynst | Nov. 11, 1930 |
| 2,091,149 | Iverson | Aug. 24, 1937 |